(12) United States Patent
Xu et al.

(10) Patent No.: US 9,505,151 B2
(45) Date of Patent: Nov. 29, 2016

(54) CARBON COMPOSITES, METHODS OF MANUFACTURE, AND USES THEREOF

(71) Applicants: Zhiyue Xu, Cypress, TX (US); Lei Zhao, Houston, TX (US)

(72) Inventors: Zhiyue Xu, Cypress, TX (US); Lei Zhao, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 502 days.

(21) Appl. No.: 14/072,016

(22) Filed: Nov. 5, 2013

(65) Prior Publication Data

US 2015/0122483 A1 May 7, 2015

(51) Int. Cl.
*B32B 9/00* (2006.01)
*B29C 43/00* (2006.01)
(Continued)

(52) U.S. Cl.
CPC ........... *B29C 43/003* (2013.01); *B29C 43/006* (2013.01); *B29D 99/0053* (2013.01); *B32B 3/28* (2013.01); *B32B 9/007* (2013.01); *B32B 9/041* (2013.01); *B32B 15/18* (2013.01); *B32B 15/20* (2013.01); *B29C 43/10* (2013.01); *B29K 2091/00* (2013.01); *B29K 2303/06* (2013.01); *B29K 2305/00* (2013.01); *B29K 2305/02* (2013.01); *B29K 2305/10* (2013.01); *B29K 2305/12* (2013.01); *B29K 2307/04* (2013.01); *B29K 2309/04* (2013.01); *B29K 2505/00* (2013.01); *B29K 2505/02* (2013.01); *B29K 2505/10* (2013.01); *B29K 2505/12* (2013.01); *B29K 2507/04* (2013.01); *B29K 2509/04* (2013.01); *B29L 2031/26* (2013.01); *B29L 2031/265* (2013.01); *B32B 2250/02* (2013.01); *B32B 2262/106* (2013.01); *B32B 2264/105* (2013.01); *B32B 2264/107* (2013.01); *B32B 2264/108* (2013.01); *B32B 2581/00* (2013.01); *Y10T 428/24331* (2015.01); *Y10T 428/30* (2015.01)

(58) Field of Classification Search
CPC ............. C09K 3/10; B32B 9/00; B32B 3/10; H01F 1/28
See application file for complete search history.

(56) References Cited

U.S. PATENT DOCUMENTS 3,300,852 A    1/1967   de Bruin
4,234,638 A    11/1980  Yamazoe et al.
(Continued)

OTHER PUBLICATIONS

International Search Report and Written Opinion; International Application No. PCT/US2014/059244; International Filing Date: Oct. 6, 2014; Date of Mailing: Jan. 14, 2015; 14 pages.

*Primary Examiner* — William P Neuder
(74) *Attorney, Agent, or Firm* — Cantor Colburn LLP (57) ABSTRACT

A carbon composite contains expanded graphite; and at least one of a filler or a reinforcement; wherein the expanded graphite comprises a plurality of randomly oriented basal planes. Methods of making the carbon composite and articles comprising the carbon composite are also disclosed.

23 Claims, 8 Drawing Sheets

(51) Int. Cl.
  *B29D 99/00* (2010.01)
  *B32B 9/04* (2006.01)
  *B32B 15/18* (2006.01)
  *B32B 15/20* (2006.01)
  *B32B 3/28* (2006.01)
  *B29C 43/10* (2006.01)
  *B29K 91/00* (2006.01)
  *B29K 505/00* (2006.01)
  *B29K 505/02* (2006.01)
  *B29K 505/10* (2006.01)
  *B29K 505/12* (2006.01)
  *B29K 507/04* (2006.01)
  *B29K 509/04* (2006.01)
  *B29K 305/00* (2006.01)
  *B29K 305/02* (2006.01)
  *B29K 305/10* (2006.01)
  *B29K 305/12* (2006.01)
  *B29K 307/04* (2006.01)
  *B29K 309/04* (2006.01)
  *B29L 31/26* (2006.01)
  *B29K 303/06* (2006.01)

(56) References Cited

U.S. PATENT DOCUMENTS

| | | | |
|---|---|---|---|
| 4,388,227 A * | 6/1983 | Kalnin | D01F 11/12 |
| | | | 106/472 |
| 8,075,794 B2 | 12/2011 | Ganguli et al. | |
| 2004/0127621 A1 | 7/2004 | Drzal et al. | |
| 2007/0142547 A1 | 6/2007 | Vaidya et al. | |
| 2009/0072448 A1* | 3/2009 | Shi | B29C 43/222 |
| | | | 264/405 |
| 2013/0195708 A1 | 8/2013 | Klett et al. | |

* cited by examiner

CARBON COMPOSITES, METHODS OF MANUFACTURE, AND USES THEREOF

BACKGROUND

This disclosure is directed to carbon composites, and in particular to carbon composites comprising expanded graphite, their methods of manufacture, and articles formed therefrom.

Elastomers are polymers having low Young's modulus and high failure strain. They are relatively soft and deformable, thus have been widely used in seals, adhesives, and molded flexible parts. Elastomers have also been used as sealing materials in downhole applications. However, as oil and gas production activities continue to shift toward more hostile and unconventional environments, the performance of elastomers becomes less than satisfactory as they are susceptible to decomposition under harsh conditions, causing safety and environmental concerns and posing limits for heavy oil exploration.

Metals have been proposed as alternative sealing materials for downhole applications due to their high corrosion resistance and excellent high pressure and high temperature tolerance. However, metals have low ductility and low elasticity. Accordingly, metals are less effective in sealing rough casing surfaces as compared to elastomers.

Therefore, there remains a need in art for sealing materials that are stable under high pressure, high temperature, and/or corrosive environments while at the same time exhibiting excellent elastic properties.

BRIEF DESCRIPTION

In an embodiment, a carbon composite comprises expanded graphite; and at least one of a filler or a reinforcement; wherein the expanded graphite comprises a plurality of randomly oriented basal planes.

In another embodiment, a method of forming a carbon composite comprises: compressing a composition comprising expanded graphite and optionally a reinforcement to form a pre-form comprising an expanded graphite matrix and a plurality of connecting open pores disposed in the matrix; and combining the pre-form with a filler thereby making the carbon composite; wherein the expanded graphite matrix in the carbon composite comprises a plurality of randomly oriented basal planes.

In yet another embodiment, a method of forming a carbon composite comprises: firstly compressing expanded graphite to form compressed expanded graphite; milling the compressed expanded graphite to form expanded graphite particles; combining the expanded graphite particles with at least a filler or a reinforcement to form a combination; and secondly compressing the combination thereby making the carbon composite; wherein the expanded graphite in the carbon composite comprises a plurality of randomly orientated basal planes.

An article comprising the carbon composite is also disclosed.

BRIEF DESCRIPTION OF THE DRAWINGS

The following descriptions should not be considered limiting in any way. With reference to the accompanying drawings, like elements are numbered alike.

DETAILED DESCRIPTION

It has been found that carbon composites comprising expanded graphite and at least one of a filler or a reinforcement have excellent elastic properties. For example, the elasticity energy of a carbon composite can be several times more than the elastic energy of natural unexpanded graphite or the expanded graphite alone. Elastic energy is the potential mechanical energy stored in the configuration of a material or physical system as work is performed to distort its volume or shape. A higher elastic energy indicates better elasticity. The results show that the addition of a filler and/or a reinforcement to expanded graphite is effective to increase the force required to deform the composite while at the same keeping the reduction of elongation to a minimum.

In addition, larger than 20% recoverable (elastic) deformation and high stress loading of greater than 10,000 psi are observed for the carbon composites. The carbon composites also show large plastic strain at low setting force. These advantageous features allow the articles formed from the carbon composites to deform easily to seal rough casing surface. Large elastic strain further provides enough resilient force to address any potential ratchet recoil issues.

It has also been found that the tensile strength of the carbon composites can be greatly improved if the basal planes of the expanded graphite in the composite are randomly oriented. As used herein, the term "basal planes" refers to the carbon layers of the expanded graphite. "Randomly oriented" means that there is no orientation preference for the basal planes of one expanded graphite grain, particle, flake, or crystal relative to another expanded graphite grain, particle, flake, or crystal.

The composites are extremely stable under high pressure, high temperature, and corrosive environments. For example, the carbon composites are stable under a temperature of up to 750° F. and a pressure of up to 25,000 psi, and there are no changes to the composites after exposing to 3% potassium chloride at 100° C. for two weeks or after exposing to 15% HCl at room temperature for 5 days.

The discovery allows the manufacture of carbon composites suitable for use as packers or seal materials for downhole applications. As another advantageous feature, the raw materials for the carbon composites are environmentally friendly and of low cost.

In an embodiment, a carbon composite comprises expanded graphite and at least one of a filler or a reinforcement, wherein the expanded graphite comprises a plurality of randomly oriented basal planes.

Graphite is a layered material. Individual layers are held together with weak Van der Waals forces which are capable of intercalation with organic or inorganic molecules and eventual expansion. Intercalation is a process whereby an intercallant material is inserted between the individual carbon layers of graphite. A wide variety of chemicals have been used to intercalate graphite materials. These include acids, oxidants, halides, or the like.

Upon heating, the intercallant is converted from a liquid or solid state, to a gas phase. Gas formation generates pressure which pushes adjacent carbon layers apart resulting in expanded graphite.

In an embodiment, the expanded graphite of the disclosure is produced through the steps of: treating a graphite material such as natural graphite, kish graphite, pyrolytic graphite, etc., with sulfuric acid, nitric acid, chromic acid, boric acid, or halides such as $FeCl_3$, $ZnCl_2$, $SbCl_5$, to form an expandable graphite; rapidly heating the expandable graphite at a high temperature of, e.g., 800° C. or higher, so as to generate pyrolysis gas whose pressure is used to expand a space between graphite layers thereby forming the expanded graphite.

In addition to the expanded graphite, the carbon composite comprises at least one of a filler or a reinforcement. The filler comprises metal, carbon, or ceramic. Exemplary metal includes copper, aluminum, titanium, tungsten, nickel, silicon, chromium, iron, or alloys thereof. In an embodiment, the metal includes copper, aluminum, titanium, copper alloy, aluminum alloy, or titanium alloy. Exemplary carbon includes amorphous carbon, natural graphite, and carbon fiber. Exemplary ceramic materials include SiC, $Si_3N_4$, $SiO_2$, BN, and the like. These materials can be in different shapes, such as particles, fibers, and wires. Combinations of the materials can be used.

The reinforcement comprises metal or alloys thereof in various shapes. The shape of the reinforcement is not particularly limited and includes flat sheets, waved sheets, structures having a plurality of projecting portions and a plurality of trough portions. Other shapes having a regular or irregular pattern are also contemplated. Where the carbon composite comprises more than one reinforcements, the reinforcements can be disposed in such a way that they form a pattern. For example, the reinforcements can be parallel to each other. Alternatively, the reinforcements are randomly oriented. The reinforcements can have the same or different shapes. In an exemplary embodiment, the reinforcement comprises apertures. In the composite, the apertures are filled with expanded graphite. Without wishing to be bound by theory, it is believed that the physical integrity of the composite is improved by the arrangement.

The reinforcement can comprise copper, aluminum, titanium, tungsten, nickel, silicon, chromium, iron, or alloys thereof. In an embodiment, the reinforcement comprises a metallic sheet comprising stainless steel, copper alloy, aluminum alloy, or titanium alloy. Combinations of the metal and metal alloys can be used.

The expanded graphite is present in the carbon composite in an amount of 25 wt. % to 99 wt. %, 50 wt. % to 95 wt. %, or 65 wt. % to 90 wt. %, based on the total weight of the carbon composite.

Other additives such as binders or polymers may be included. However, in an embodiment, the composite is substantially free of binders and polymers. As used herein, "substantially free of" means that the composite comprises less than 5 wt. %, less than 2 wt. %, less than 1 wt. %, less than 0.5 wt. %, less than 0.1 wt. %, less than 0.05 wt. %, or less than 0.01 wt. % of binders or polymers based on the total weight of the composite. In another embodiment, the composite is free of binders and polymers.

The carbon composite has a density of 1.2 to 4.0 $g/cm^3$. Depending on the composition of the composite and the processing parameters, the density can also be 1.2 to 3.0 $g/cm^3$ or 1.4 to 2.0 $g/cm^3$.

Figure 1:
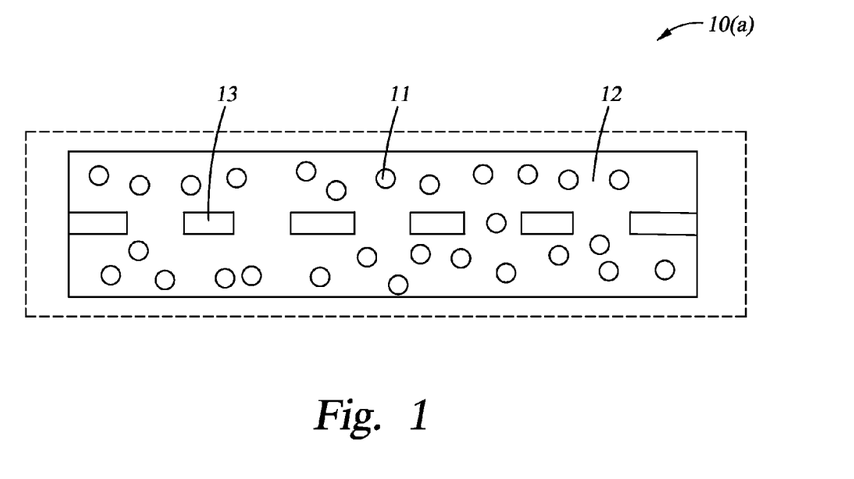
FIG. 1 is a schematic illustration of an exemplary embodiment of a carbon composite.
Figure 2:
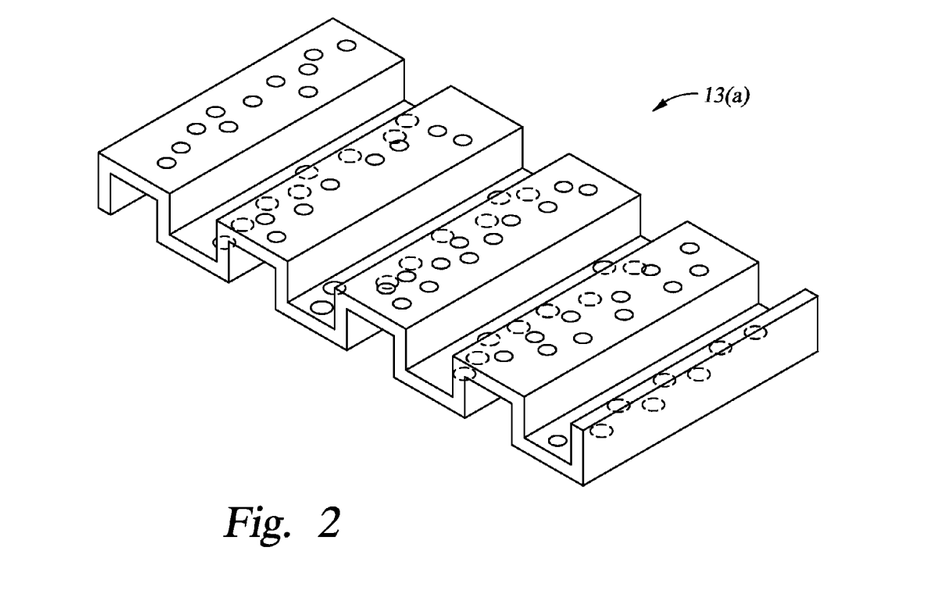
FIG. 2 is a schematic illustration of an exemplary embodiment of a reinforcement of a carbon composite.
Figure 3:
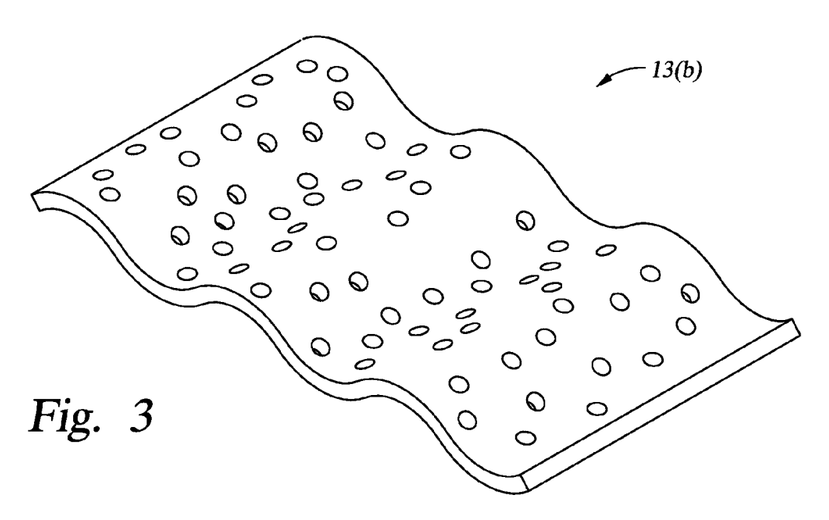
FIG. 3 is schematic illustration of another exemplary embodiment of a reinforcement of a carbon composite.

An exemplary embodiment of carbon composite is illustrated in FIG. 1. As shown in FIG. 1, carbon composite 10(a) comprises expanded graphite 12, filler 11, and reinforcement 13. The reinforcement comprises a plurality of apertures, which are filled by the expanded graphite. Other exemplary reinforcements are shown in FIGS. 2 and 3 as 13(a) and 13(b).

Various methods can be used to manufacture the carbon composites. In an embodiment, a method of forming a carbon composite comprises combining expanded graphite and at least one of a filler or a reinforcement to form a combination; and compressing the combination under an isostatic pressure thereby forming the carbon composite.

Inventors hereof have found that when the basal planes of the expanded graphite are randomly oriented, the tensile strength of the carbon composites or an article produced therefrom can be greatly improved.

As used herein, "isostatic pressure" means that a pressure is applied at more than one direction. Both cold pressing and hot pressing can be used. Without wishing to be bound by theory, it is believed that under uniaxial force, expanded graphite particles, flakes, crystals, or the like slide and rearrange so that the basal planes are parallel to each other. When isostatic forces are applied, the rearrangement of the expanded graphite is minimized and the produced composite has basal planes in random directions.

In an exemplary embodiment, the combining comprises combining expanded graphite and a metallic filler or combining expanded graphite, a metallic filler, and a reinforcement comprising a metallic reinforcement.

Alternatively, an expanded graphite composition is first pressed to form a pre-form. The pre-form is then combined with a filler to form the carbon composite. If necessary, the filled pre-form can be further compressed.

Advantageously, the pre-form comprises an expanded graphite matrix and open pores connecting to each other. One way to produce open pores is to add a material such as wax to the expanded graphite before compressing the expanded graphite to make the pre-form. Upon the removal of the wax by heating, connecting open pores are formed in the expanded graphite matrix.

The filler is subsequently added to the pre-form through infiltration. In the instance where the filler is metal, the metallic filler can be heated to a molten state first, and then the molten metallic filler is poured to the pre-form. The metallic filler fills the open pores thereby forming the carbon composite.

The expanded graphite composition to make the pre-form comprises expanded graphite and optionally a reinforcement. Wax can also be included in the expanded graphite composition in order to make a pre-form having connecting open pores.

In another embodiment, the compressed expanded graphite, for example, one made by applying uniaxial force, is broken into small pieces by grounding, chopping or milling, for example, ball milling. The small pieces can be pressed to form a pre-form. Then the filler is added as described herein to the pre-form to provide the carbon composite. Alternatively, the small pieces can be blended with a filler or reinforcement, then hot or cold pressed to form the carbon composite. If needed, a binder can be added. It is also to be appreciated that different combinations of the foregoing operations can be used and is contemplated.

Figure 4:
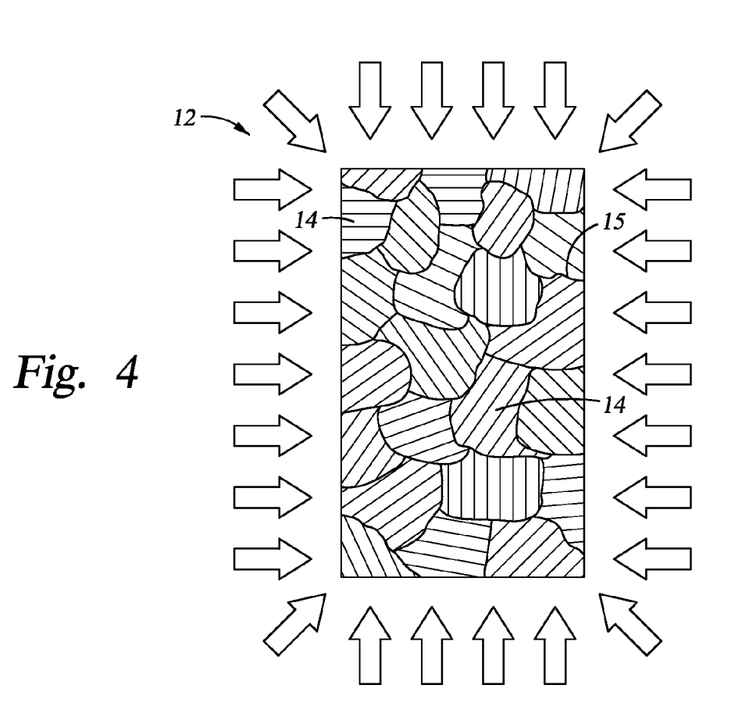
FIG. 4 is a schematic illustration of isostatic hot or cold pressing of expanded graphite.

The methods have been further illustrated in FIGS. 4-7. Referring initially to FIG. 4, by applying isostatic forces, basal planes 14 of the expanded graphite 12 are randomly oriented. Lines 15 represent the boundaries of the expanded graphite grains, particles, crystals, or the like.

Figure 5:
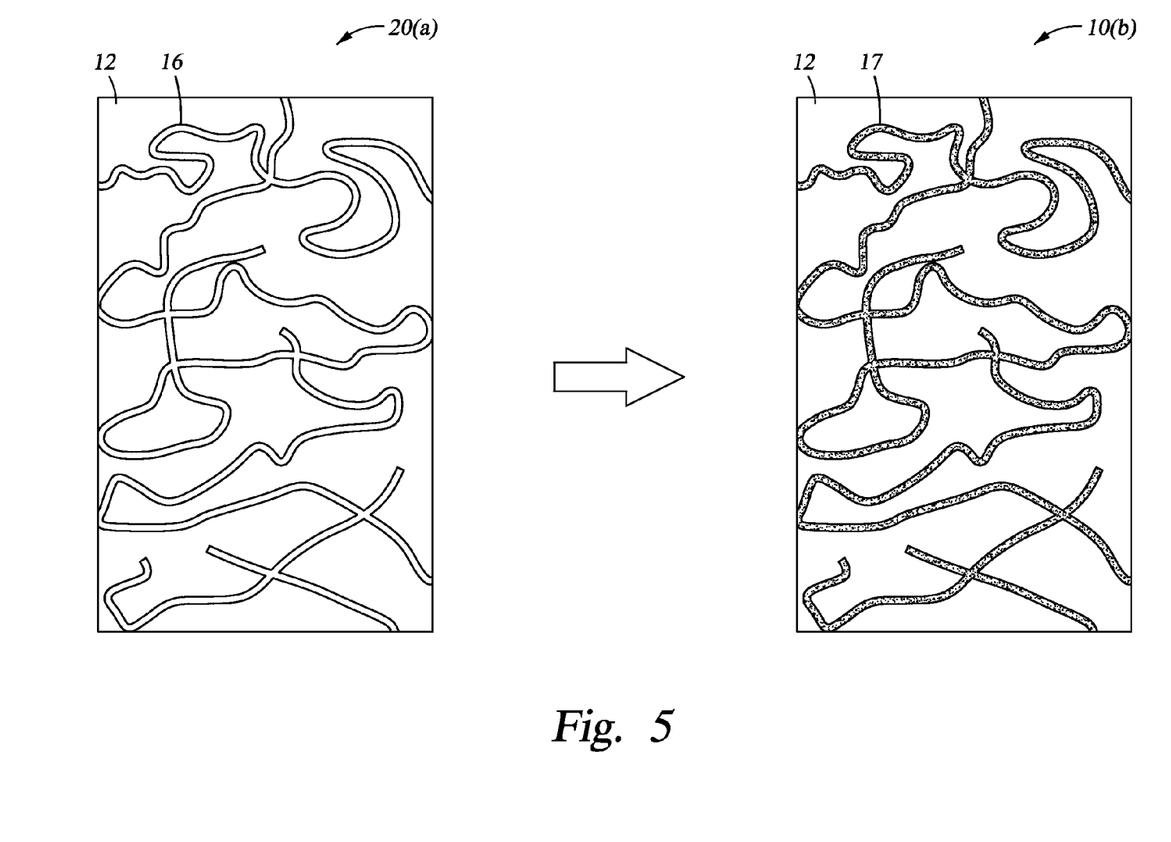
FIG. 5 is a schematic illustration of the formation of a carbon composite via metallic infiltration of expanded graphite matrix.

In FIG. 5, a pre-form 20(a) comprises expanded graphite 12 and connecting open pores 16. After infiltration, the connecting pores are filled with metal (17) thereby forming the carbon composite 10(b).

Figure 6:
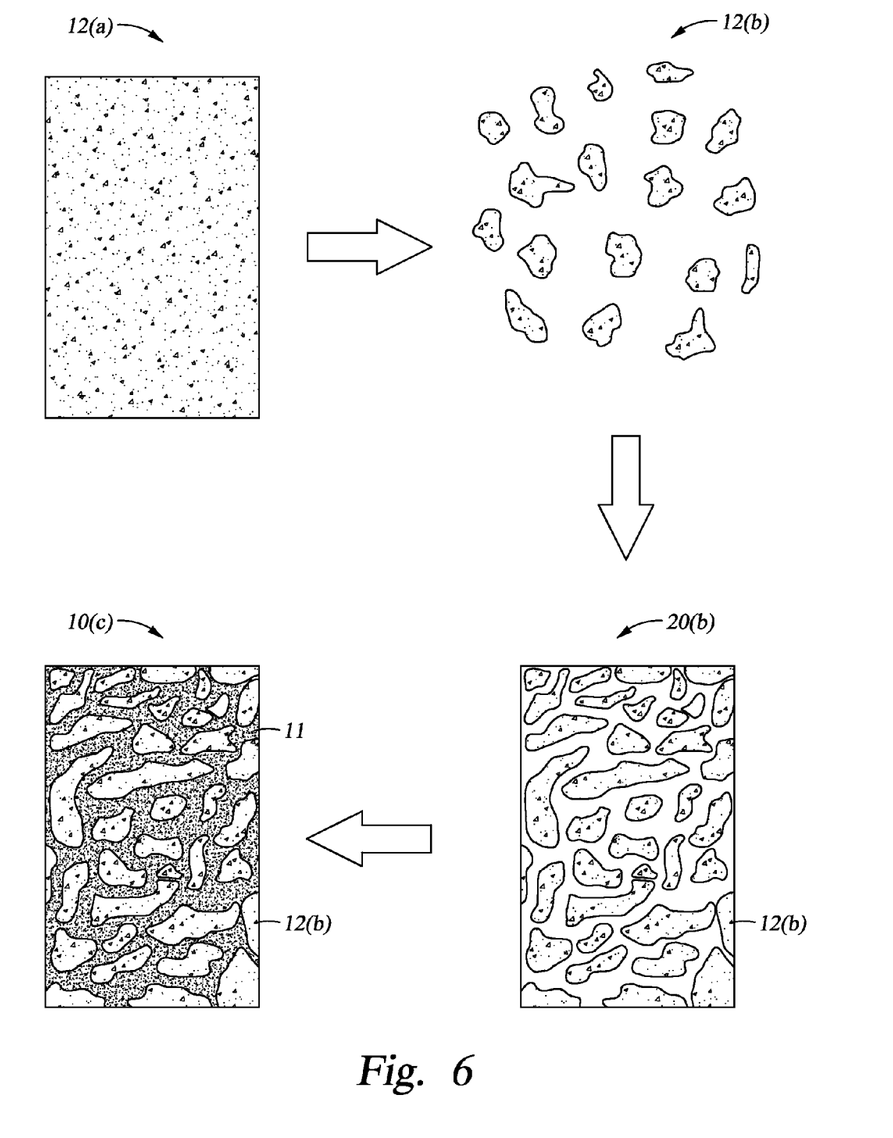
FIG. 6 is a schematic illustration of the formation of a carbon composite by milling or chopping compressed expanded graphite, re-pressing the milled or chopped expanded graphite, and introducing a filler by infiltration.

In FIG. 6, expanded graphite is first compressed to form compressed expanded graphite 12(a). The compressed graphite 12(a) is then milled to form small pieces 12(b) of expanded graphite. The small pieces 12(b) are compressed to form a pre-form 20(b), to which, filler 11 is added, through for example, infiltration, thereby forming the carbon composite 10(c).

Figure 7:
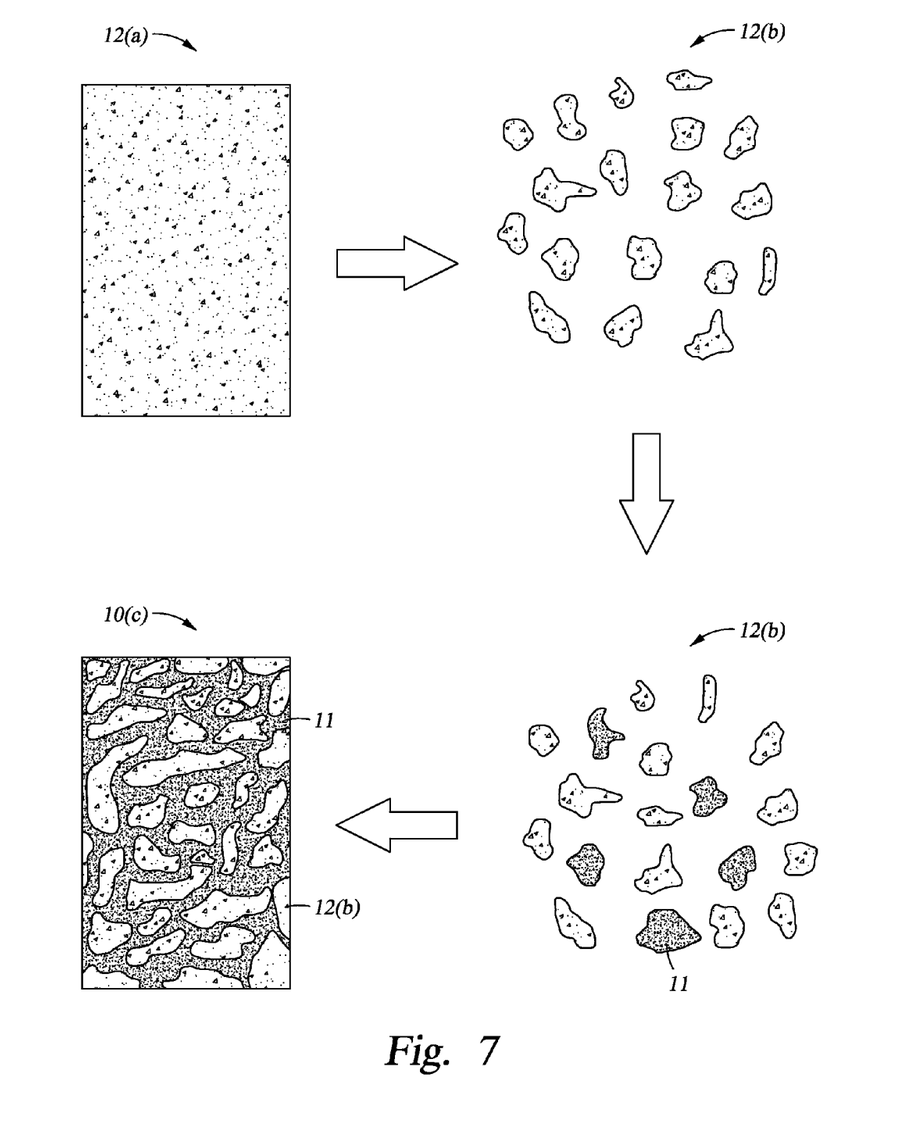
FIG. 7 is a schematic illustration of the formation of a carbon composite by milling compressed expanded graphite and re-pressing the milled expanded graphite together with a binder and/or a filler.
Figure 8:
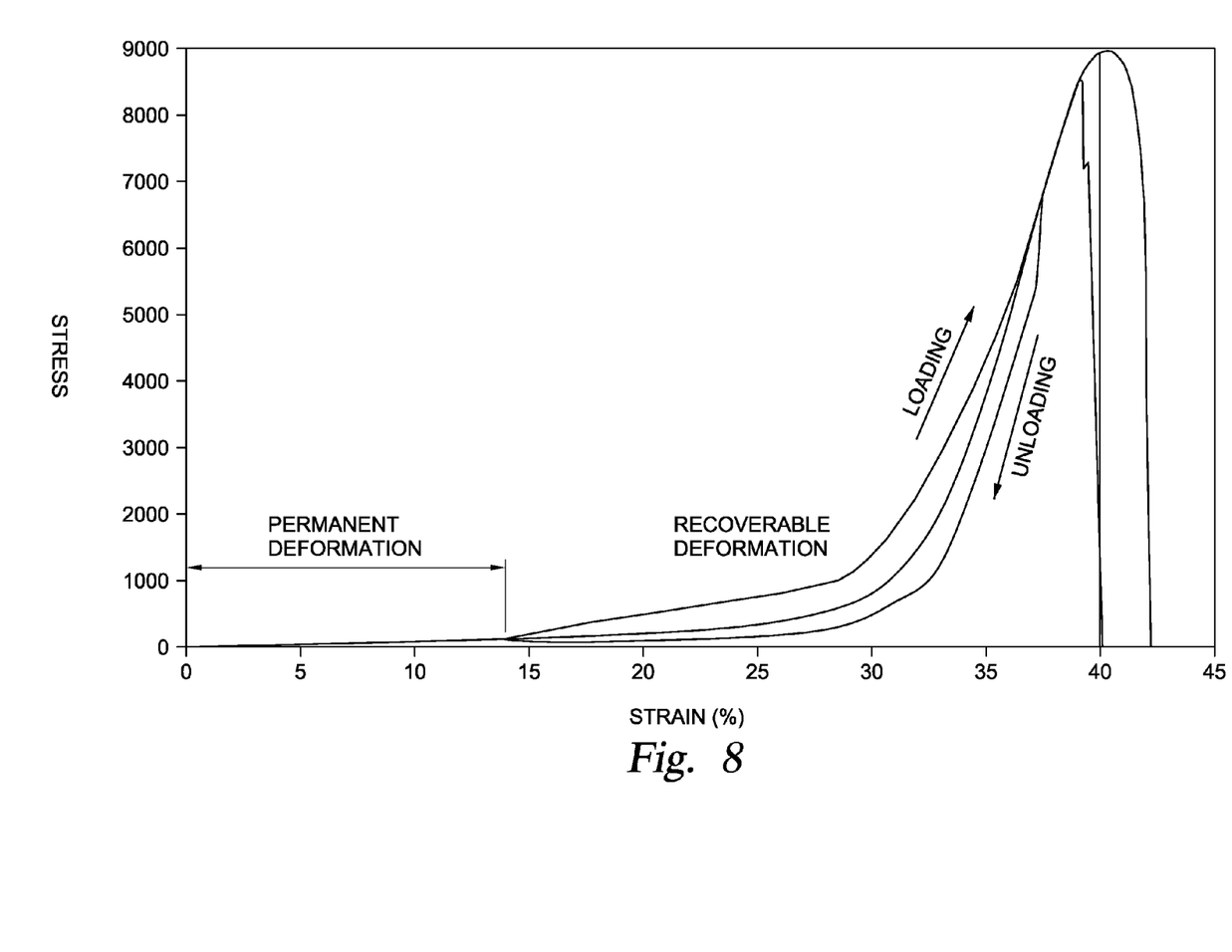
FIG. 8 shows a stress-strain curve of an exemplary embodiment of a carbon composite.

In FIG. 7, small pieces of expanded graphite 12(b) formed from milling or chopping the compressed expanded graphite 12(a), are combined with filler 11 to form a combination. Then the combination is compressed forming the carbon composite 10(d).

Articles can be made from the carbon composites. Thus, in an embodiment, an article comprises the carbon composite. The carbon composite may be used to form all or a portion of an article. Illustrative articles include compression packing elements (premier seal), expanding packing elements (ARC seal), O-rings, bonded seals, bullet seals, SSSV dynamic seals, SSSV flapper seals, V rings, back up rings, drill bit seals, mud motor stators, PCP stators, ESP seals, ESP space out sub. The article can be a downhole element. In an embodiment, the article is a packer, a seal, or an O-ring.

EXAMPLES

Example 1

Preparation of Expanded Graphite

Expandable graphite with the size and pH as shown in table 1 was heated to 800° C. for 3 minutes to obtain expanded graphite. The expansion ratios are shown in Table 1.

TABLE 1

| Size | pH | Expansion Ratio |
| --- | --- | --- |
| 50-80 Mesh (180-300 µm) | 1-6 | 215-300 |
| 40-50 Mesh (300-425 µm) | 1-6 | 250-300 |
| 70% >50 Mesh (300 µm) | 5-8 | 106-126 |
| 80% >80 Mesh (180 µm) | 5-8 | 66-86 |

Example 2

Preparation and Evaluation of Carbon Composite

Expanded graphite obtained in Example 1 was evenly mixed with Cu at a weight ratio of 75 to 25 (expanded graphite/Cu), and then the mixture was compressed into a test sample under 30,000 psi in a steel die.

The cylindrical test coupons were tested under unconfined compressing mode to determine the plasticity and elasticity of resulting composites. The loading loops of loading and unloading were applied to the test coupons, with the unrecoverable strain defined as permanent deformation and recoverable strain as recoverable deformation or elastic deformation, as shown in FIG. 6. The test deformation rate was 0.4 inch/min. The initial permanent deformation under low loading force enables efficient sealing as it can deform easily onto the rough sealing mate surfaces such as casing surfaces, and the subsequent elastic strain store enough elastic energy to constantly provide sealing force during operation, addressing the recoil issue commonly observed in the downhole packer setting up.

To illustrate the improvement of elastic energy achieved by the composites, the stress-strain curves for the natural unexpanded graphite, expanded graphite, and the carbon composite are shown in FIG. 7. For the natural unexpanded graphite, the sample was made by compressing natural graphite in a steel die at a high pressure. The expanded graphite sample was also made in a similar manner. For the carbon composite, expanded graphite powder was first evenly mixed with copper powder through mechanical mixing, and then the mixture was compressed in a steel die at a high pressure to form the test sample.

Figure 9:
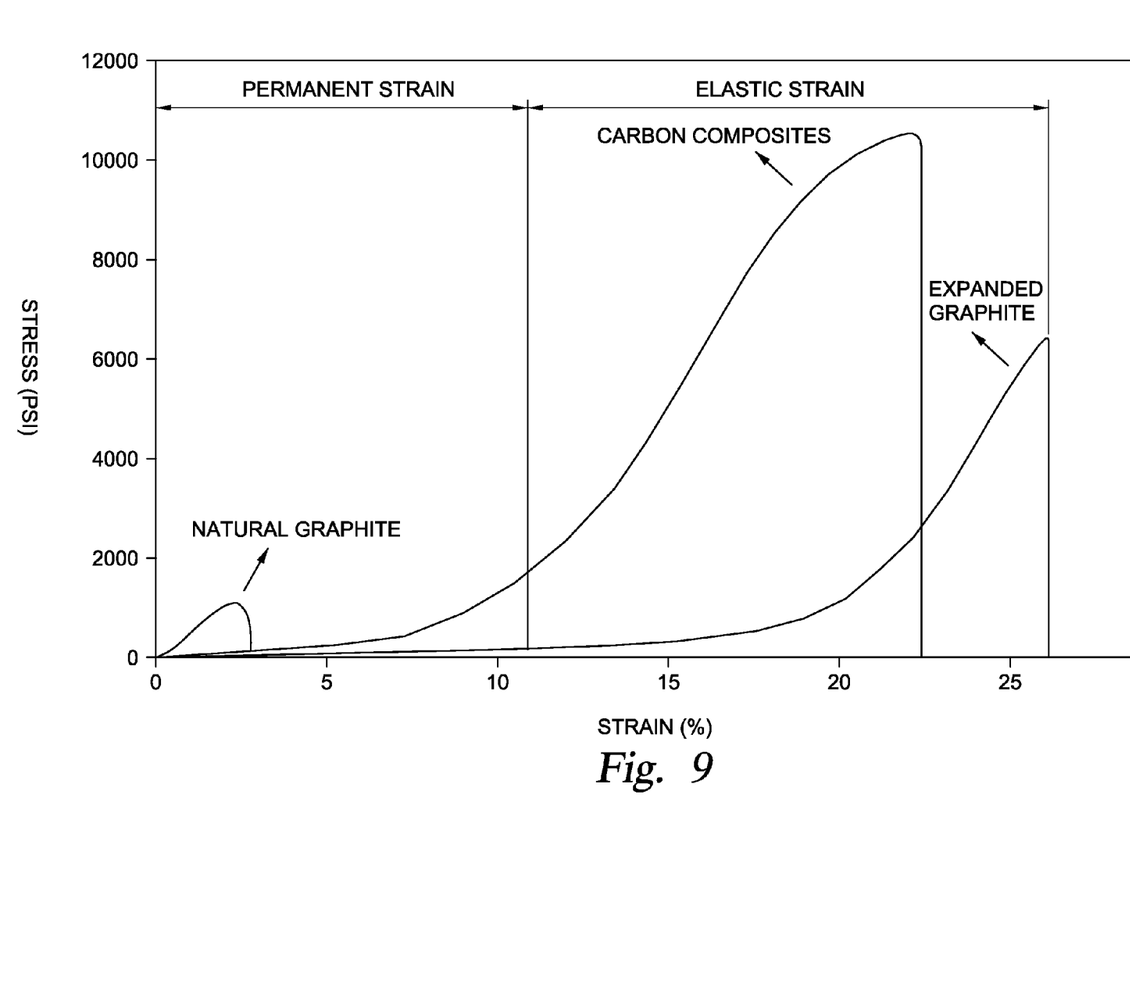
FIG. 9 shows stress-strain curves of natural graphite, expanded graphite, and a carbon composite, respectively.

As shown in FIG. 9, the natural graphite has a very low elastic energy (area under the stress-strain curve) and is very brittle. The elastic energy of expanded graphite is higher than that of the natural graphite. However, it is still less than desirable. Conversely, the carbon composite of the disclosure exhibits significantly improved elasticity shown by the notable increase of the elastic energy as compared to the natural graphite and expanded graphite alone.

Figure 10:
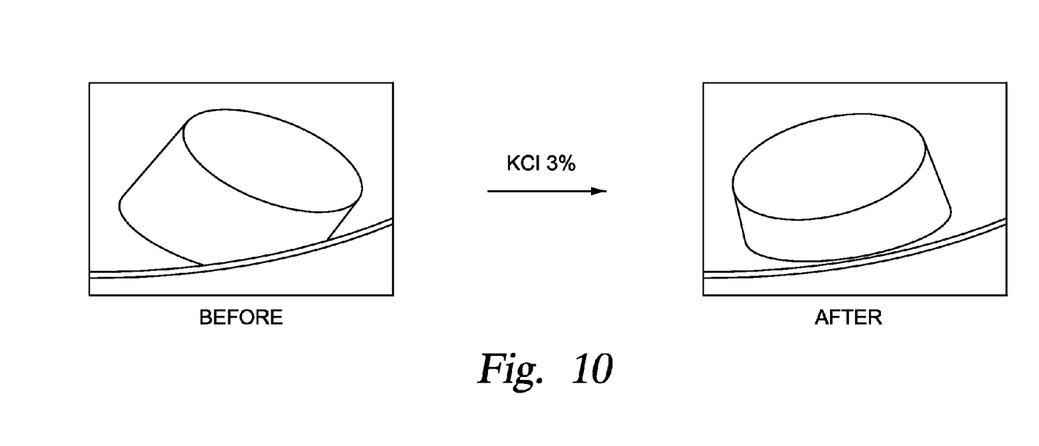
FIG. 10 shows a carbon composite product before and after exposing to 3% of KCl at 100° C. for two weeks.

Next, the chemical resistance of carbon composites was tested. A first sample made from the carbon composite was exposed to 3% of KCl at 100° C. for two weeks. As shown in FIG. 10, there were no changes to the sample.

Figure 11:
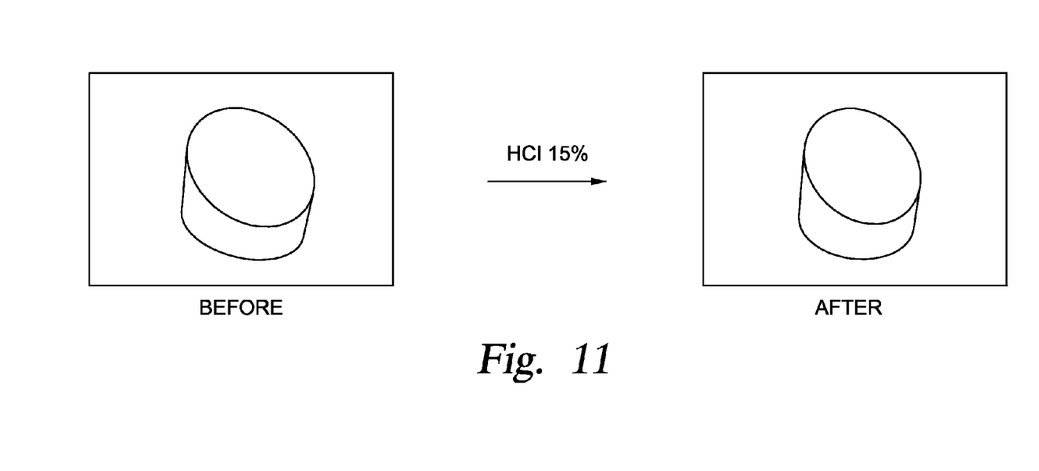
FIG. 11 shows a carbon composite product before and after exposing to 15% HCl at room temperature for 5 days.

A second sample made from the carbon composite was exposed to 15% of HCl at room temperature for 5 days. As shown in FIG. 11, there were no changes to the sample.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A carbon composite comprising:
   expanded graphite; and
   at least one of a filler or a reinforcement;
   wherein the expanded graphite comprises a plurality of randomly oriented basal planes.

2. The carbon composite of claim 1, wherein the filler comprises metal, carbon, ceramic, or a combination comprising at least one of the foregoing.

3. The carbon composite of claim 2, wherein the metal comprises copper, aluminum, titanium, tungsten, nickel, silicon, chromium, iron, alloys thereof, or a combination comprising at least one of the foregoing.

4. The carbon composite of claim 2, wherein the carbon comprises amorphous carbon, natural graphite, carbon fiber, or a combination comprising at least one of the foregoing material.

5. The carbon composite of claim 2, wherein the ceramic comprises SiC, $Si_3N_4$, $SiO_2$, BN, and a combination comprising at least one of the foregoing.

6. The carbon composite of claim 1, wherein the reinforcement comprises a metallic sheet comprising stainless steel, copper alloy, aluminum alloy, titanium alloy, or a combination comprising at least one of the foregoing.

7. The carbon composite of claim 6, wherein the metallic sheet comprises an aperture.

8. The carbon composite of claim 1, wherein the expanded graphite is present in an amount of 25 wt. % to 99 wt. %, based on the total weight of the carbon composite.

9. An article comprising the carbon composite of claim 1.

10. The article of claim 9, wherein the article is a downhole element.

11. The article of claim 10, wherein the article comprises packing elements (premier seal), expanding packing elements (ARC seal), O-rings, bonded seals, bullet seals, SSSV dynamic seals, SSSV flapper seals, V rings, back up rings, drill bit seals, mud motor stators, PCP stators, ESP seals, or ESP space out sub.

12. A method for making a carbon composite, the method comprising
    combining expanded graphite and at least one of a filler or a reinforcement to form a combination; and
    compressing the combination under an isostatic pressure thereby making the carbon composite;
    wherein the basal planes of the expanded graphite in the carbon composite are randomly oriented.

13. The method of claim 12, wherein the combining comprises combining expanded graphite and a metallic filler.

14. The method of claim 12, wherein the combining comprises combining expanded graphite, a metallic filler, and a reinforcement comprising a metallic sheet.

15. A method for making a carbon composite, the method comprising
    compressing a composition comprising expanded graphite to form a pre-form comprising an expanded graphite matrix and a plurality of connecting open pores disposed in the matrix; and
    combining the pre-form with a filler thereby making the carbon composite;
    wherein the expanded graphite matrix in the carbon composite comprises a plurality of randomly oriented basal planes.

16. The method of claim 15, further comprising compressing the combination of the pre-form and the filler thereby making the composite.

17. The method of claim 15, wherein the composition further comprises wax.

18. The method of claim 17, wherein the compressing is conducted at a temperature greater than the melting temperature of the wax.

19. The method of claim 15, wherein the combining comprises pouring a molten metallic filler to the pre-form.

20. The method of claim 15, further comprising forming the composite by
    compressing expanded graphite to form compressed expanded graphite; and
    milling the compressed expanded graphite to form graphite particles.

21. The method of claim 20 further comprising combining the graphite particle with a reinforcement.

22. The method of claim 15, wherein the pre-form further comprises a reinforcement.

23. A method of forming a carbon composite, the method comprises:
    firstly compressing expanded graphite to form compressed expanded graphite;
    milling the compressed expanded graphite to form expanded graphite particles;
    combining the expanded graphite particles with at least a filler or a reinforcement to form a combination; and
    secondly compressing the combination thereby making the carbon composite;
    wherein the expanded graphite in the carbon composite comprises a plurality of randomly orientated basal planes.

* * * * *